United States Patent
Lewis et al.

(10) Patent No.: US 6,434,714 B1
(45) Date of Patent: *Aug. 13, 2002

(54) METHODS, SYSTEMS, AND ARTICLES OF MANUFACTURE FOR ANALYZING PERFORMANCE OF APPLICATION PROGRAMS

(75) Inventors: Bradley Lewis; Jeremy Week, both of Broomfield; Michael Boucher, Layfayette; Shaun Dennie, Wesunjnstar, all of CO (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,895

(22) Filed: Feb. 4, 1999

(51) Int. Cl.[7] .............................................. G06F 11/00
(52) U.S. Cl. .................................... 714/38; 702/186
(58) Field of Search .............................. 714/38, 47, 33, 714/45, 57; 702/186

(56) References Cited

U.S. PATENT DOCUMENTS

| | | |
|---|---|---|
| 4,675,832 A | 6/1987 | Robinson et al. |
| 4,812,996 A | 3/1989 | Stubbs |
| 5,079,707 A | 1/1992 | Bird et al. |
| 5,325,499 A | 6/1994 | Kummer et al. |
| 5,325,533 A | 6/1994 | McInerney et al. |
| 5,463,775 A * | 10/1995 | DeWitt ............ 702/186 |
| 5,485,574 A * | 1/1996 | Bolosky ............ 714/35 |
| 5,499,349 A | 3/1996 | Nikhil et al. |
| 5,500,881 A | 3/1996 | Levin et al. |
| 5,519,866 A | 5/1996 | Lawrence et al. |
| 5,530,816 A | 6/1996 | Holt |
| 5,553,235 A * | 9/1996 | Chen ............ 714/20 |
| 5,613,063 A | 3/1997 | Eustace et al. |
| 5,636,374 A | 6/1997 | Rodgers et al. |
| 5,673,387 A * | 9/1997 | Chen ............ 714/38 |
| 5,675,790 A | 10/1997 | Walls |
| 5,675,802 A | 10/1997 | Allen et al. |
| 5,689,712 A | 11/1997 | Heisch |
| 5,724,262 A | 3/1998 | Ghahramani |
| 5,742,793 A | 4/1998 | Sturges et al. |
| 5,748,961 A | 5/1998 | Hanna et al. |
| 5,784,698 A | 7/1998 | Brady et al. |

(List continued on next page.)

FOREIGN PATENT DOCUMENTS

| | | |
|---|---|---|
| DE | 199 34 515 A1 | 1/2000 |
| EP | 0 703 534 A | 3/1996 |
| EP | 0 817 044 A2 | 1/1998 |
| WO | WO 99/10812 A | 3/1999 |

OTHER PUBLICATIONS

Broberg, Lundberg and Grahn "Visualization and Performance Prediction of Multithreaded Solaris Programs by Tracing Kernel Threads".*

Haggander et al., "Optimizing Dynamic Memory in a Multithreaded Application Executing on a Multiprocessor," International Conference on Parallel Processing, Minneapolis, MN, Aug. 10–14, 1998, pp. 262–269.

(List continued on next page.)

Primary Examiner—Robert Beausoleil
Assistant Examiner—Bryce P. Bonzo
(74) Attorney, Agent, or Firm—Finnegan, Henderson, Farabow, Garrett & Dunner, LLP

(57) ABSTRACT

Method, systems and articles of manufacture consistent with the present invention collects and displays performance data associated with executed programs. A system consistent with an implementation of the present invention collects performance analysis information from various hardware and software components of an instrumented program, and displays the performance data in a multi-dimensional format.

5 Claims, 4 Drawing Sheets

U.S. PATENT DOCUMENTS

| | | | | |
|---|---|---|---|---|
| 5,787,480 A | | 7/1998 | Scales et al. | |
| 5,805,795 A | * | 9/1998 | Whitten | 714/38 |
| 5,835,705 A | * | 11/1998 | Larsen et al. | 709/107 |
| 5,850,554 A | | 12/1998 | Carver | |
| 5,864,867 A | | 1/1999 | Krusche et al. | |
| 5,867,649 A | | 2/1999 | Larson | |
| 5,872,977 A | | 2/1999 | Thompson | |
| 5,905,488 A | | 5/1999 | Demers et al. | |
| 5,963,975 A | | 10/1999 | Boyle et al. | |
| 5,974,536 A | | 10/1999 | Richardson | |
| 5,978,892 A | | 11/1999 | Noel et al. | |
| 5,991,893 A | | 11/1999 | Snider | |
| 6,016,474 A | | 1/2000 | Kim et al. | |
| 6,018,793 A | | 1/2000 | Rao | |
| 6,044,438 A | | 3/2000 | Olnowich | |
| 6,049,798 A | * | 4/2000 | Bishop | 707/10 |
| 6,052,708 A | * | 4/2000 | Flynn et al. | 709/108 |
| 6,065,019 A | | 5/2000 | Ault et al. | |
| 6,081,868 A | * | 6/2000 | Brooks | 710/18 |
| 6,085,029 A | | 7/2000 | Kolawa et al. | |
| 6,098,169 A | * | 8/2000 | Ranganathan | 702/182 |
| 6,101,525 A | | 8/2000 | Hecker | |
| 6,125,430 A | | 9/2000 | Noel et al. | |
| 6,223,134 B1 | | 4/2001 | Rust et al. | |
| 6,249,906 B1 | * | 6/2001 | Levine | 717/1 |
| 6,269,457 B1 | * | 7/2001 | Lane | 714/38 |

OTHER PUBLICATIONS

Larson et al., "Memory Allocation for Long–Running Server Applications," ISMM 1998, International Symposium on Memory Management, Vancouver, BC, Canada, Oct. 17–19, 1998, vol. 34, No. 3, pp. 176–185.

"Algorithm Visualization System: Introduction," available online at: www.cp/eng.chula.ac.th/faculty/spj/research/avis/intro.html as of Jun. 10, 1999, 2 pages.

"Caching Objects In A Data Space," IBM Technical Disclosure Bulletin, IBM Corp., vol. 37, No. 10, Oct. 1994, pp. 587–590.

"GeoMAMOS Project Home Page," available online at: www.ece.nwu.edu/~theory/geomamos.html as of Jun. 10, 1999, 4 pages.

"Introduction," available online at: www.ece.nwu.edu/~theory/gs_tech_1_html/section 3_1.html as of Jun. 10, 1999, 3 pages.

"Pentium Processor Family User Manual Volume 3: Architecture and Programming Manual," pp. 25–182, 25–183, 25–309, and 25–310, Intel. Corp., (1994).

"Purify for Windows NT, Product Overview," Ver. 6.0, available online at: www.rational.com/products/purify_nt/prodinfo/index.jtmpl as of Jan. 11, 1999, 3 pages.

"Scientific Simulations and Algorithm Visualizations Using NESL and Java," available online at: www.cs.cmu.edu/~scandal/applets/ as of Jun. 10, 1999, 1 page.

"Visualization for Developing Geometric Algorithms," available online at: www.ece.nwu.edu/~theory/gs_tech_1_html/section 3_3.html as of Jun. 10, 1999, 2 pages.

Attali et al., "Semantic–Based Visualization for Parallel Object–Oriented Programming," Proceedings of the 11th Annual Conference on Object Oriented Programming Systems, 1996, pp. 421–440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232–282.

David E. Culler et al., "Parallel Computer Architecture", Morgan Kaufman Publishers, Inc., San Francisco, California, 1999.

Ian Foster, "Designing and Building Parallel Programs", Addison–Wesley Publishing Company, 1995.

Kevin Dowd and Charles R. Severance, "High Performance Computing," Second Edition, Chapter 10, Shared Memory Multiprocessors, Aug. 1998, pp. 216–218.

Sun Microsystems Computer Company, "Prism 5.0 Reference Manual," Revision A., Nov. 1997.

Sun Microsystems, "UltraSPARC User's Manual," UltraSPARC–1, UltraSPARC–II, Jul. 1997, pp. 319–325.

Wasserman et al., "A Graphical, Extensible Integrated Environment for Software Development," Proceedings of the ACD SIGSOFT/SIGPLAN Software Engineering Symposium on Practical Software Development Environments, 1986, pp. 131–142.

Ian Foster, *Designing and Building Parallel Programs*, Addison–Wesley Publishing Company, 1995.

Barry Wilkinson and Michael Allen, *Parallel Programming*, Prentice Hall, 1999.

David E. Culler and Jaswinder Pal Singh, *Parallel Computer Architecture*, Morgan Kaufman Publishers, Inc., 1999.

Sun Microsystems Computer Company, *Prism 5.0 Reference Manual*, Revision A., Nov. 1997.

* cited by examiner

METHODS, SYSTEMS, AND ARTICLES OF MANUFACTURE FOR ANALYZING PERFORMANCE OF APPLICATION PROGRAMS

FIELD OF THE INVENTION

The present invention relates generally to performance analysis and more specifically to methods for providing a multi-dimensional view of performance data associated with an application program.

BACKGROUND

Multi-threading is the partitioning of an application program into logically independent "threads" of control that can execute in parallel. Each thread includes a sequence of instructions and data used by the instructions to carry out a particular program task, such as a computation or input/output function. When employing a data processing system with multiple processors, i.e., a multiprocessor computer system, each processor executes one or more threads depending upon the number of processors to achieve multi-processing of the program.

A program can be multi-threaded and still not achieve multi-processing if a single processor is used to execute all threads. While a single processor can execute instructions of only one thread at a time, the processor can execute multiple threads in parallel by, for example, executing instructions corresponding to one thread until reaching a selected instruction, suspending execution of that thread, and executing instructions corresponding to another thread, until all threads have completed. In this scheme, as long as the processor has started executing instructions for more than one thread during a given time interval all executing threads are said to be "running" during that time interval.

Multiprocessor computer systems are typically used for executing application programs intended to address complex computational problems in which different aspects of a problem can be solved using portions of a program executing in parallel on different processors. A goal associated with using such systems to execute programs is to achieve a high level of performance, in particular, a level of performance that reduces the waste of the computing resources. Computer resources may be wasted, for example, if processors are idle (i.e., not executing a program instruction) for any length of time. Such a wait cycle may be the result of one processor executing an instruction that requires the result of a set of instructions being executed by another processor.

It is thus necessary to analyze performance of programs executing on such data processing systems to determine whether optimal performance is being achieved. If not, areas for improvement should be identified.

Performance analysis in this regard generally requires gathering information in three areas. The first considers the processor's state at a given time during program execution. A processor's state refers to the portion of a program (for example, set of instructions such as a subprogram, loop, or other code block) that the processor is executing during a particular time interval. The second considers how much time a processor spends in transition from one state to another. The third considers how close a processor is to executing at its peak performance. These three areas do not provide a complete analysis, however. They fail to address a fourth component of performance analysis, namely, precisely what a processor did during a particular state (e.g., computation, input data, output data, etc.).

When considering what a processor did while in a particular state, a performance analysis tool can determine the affect of operations within a state on the performance level. Once these factors are identified, it is possible to synchronize operations that have a significant impact on performance with operations that have a less significant impact, and achieve a better overall performance level. For example, a first thread may perform an operation that uses significant resources while another thread scheduled to perform a separate operation in parallel with the first thread sits idle until the first thread completes its operation. It may be desirable to cause the second thread to perform a different operation that does not require the first thread to complete its operation, thus eliminating the idle period for the second thread. By changing the second thread's schedule in this way the operations performed by both threads are better synchronized.

When a performance analysis tool reports a problem occurring in a particular state, but fails to relate the problem to other events occurring in an application (for example, operations of another state), the information reported is relatively meaningless. To be useful a performance analysis tool must assist a developer in determining how performance information relates to a program's execution. Therefore, allowing a developer to determine the context in which a performance problem occurs, provides insight into diagnosing the problem.

The process of gathering this information for performance analysis is referred to as "instrumentation." Instrumentation generally requires adding instructions to a program under examination so that when the program is executed the instructions generate data from which the performance information can be derived.

Current performance analysis tools gather data in one of two ways: subprogram level instrumentation and bucket level instrumentation. A subprogram level instrumentation method of performance analysis tracks the number of subprogram calls by instrumenting each subprogram with a set of instructions that generate data reflecting calls to the subprogram. It does not allow a developer to track performance data associated with the operations performed by each subprogram or a specified portion of the subprogram, for example, by specifying data collection beginning and ending points within a subprogram.

A bucket level instrumentation performance analysis tool divides the executable code into evenly spaced groups, or buckets. Performance data tracks the number of times a program counter was in a particular bucket at the conclusion of a specified time interval. This method of gathering performance data essentially takes a snapshot of the program counter at the specified time interval. This method fails to provide comprehensive performance information because it only collects data related to a particular bucket during the specified time interval.

The current performance analysis methods fail to provide customized collection or output of performance data. Generally, performance tools only collect a pre-specified set of data to display to a developer.

SUMMARY OF THE INVENTION

Methods, systems, and articles of manufacture consistent with the present invention overcome the shortcomings of the prior art by facilitating performance analysis of multi-threaded programs executing in a data processing system. Such methods, systems, and articles of manufacture analyze performance of threads executing in a data processing system by receiving data reflecting a state of each thread executing during a measurement period, and displaying a performance level corresponding to the state of each thread during the measurement period.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

Overview

Methods, systems, and articles of manufacture consistent with the present invention utilize performance data collected during execution of an application program to illustrate graphically for the developer performance data associated with the program. The program is instrumented to generate the performance data during execution. Each program thread performs one or more operations, each operation reflecting a different state of the thread. The performance data may reflect an overall performance for each thread as well as a performance level for each state within a thread during execution. The developer can specify the type and extent of performance data to be collected. By providing a graphical display of the performance of all threads together, the developer can see where to make any appropriate adjustments to improve overall performance by better synchronizing operations among the threads.

A performance analysis database access language is used to instrument the program in a manner consistent with the principles of the present invention. Instrumentation can be done automatically using known techniques that add instructions to programs at specific locations within the programs, or manually by a developer. The instructions may specify collection of performance data from multiple system components, for example, performance data may be collected from both hardware and the operating system.

A four-dimensional display of performance data includes information on threads, times, states, and performance level. A performance analyzer also evaluates quantitative expressions corresponding to performance metrics specified by a developer, and displays the computed value.

Performance Analysis System

Figure 1:
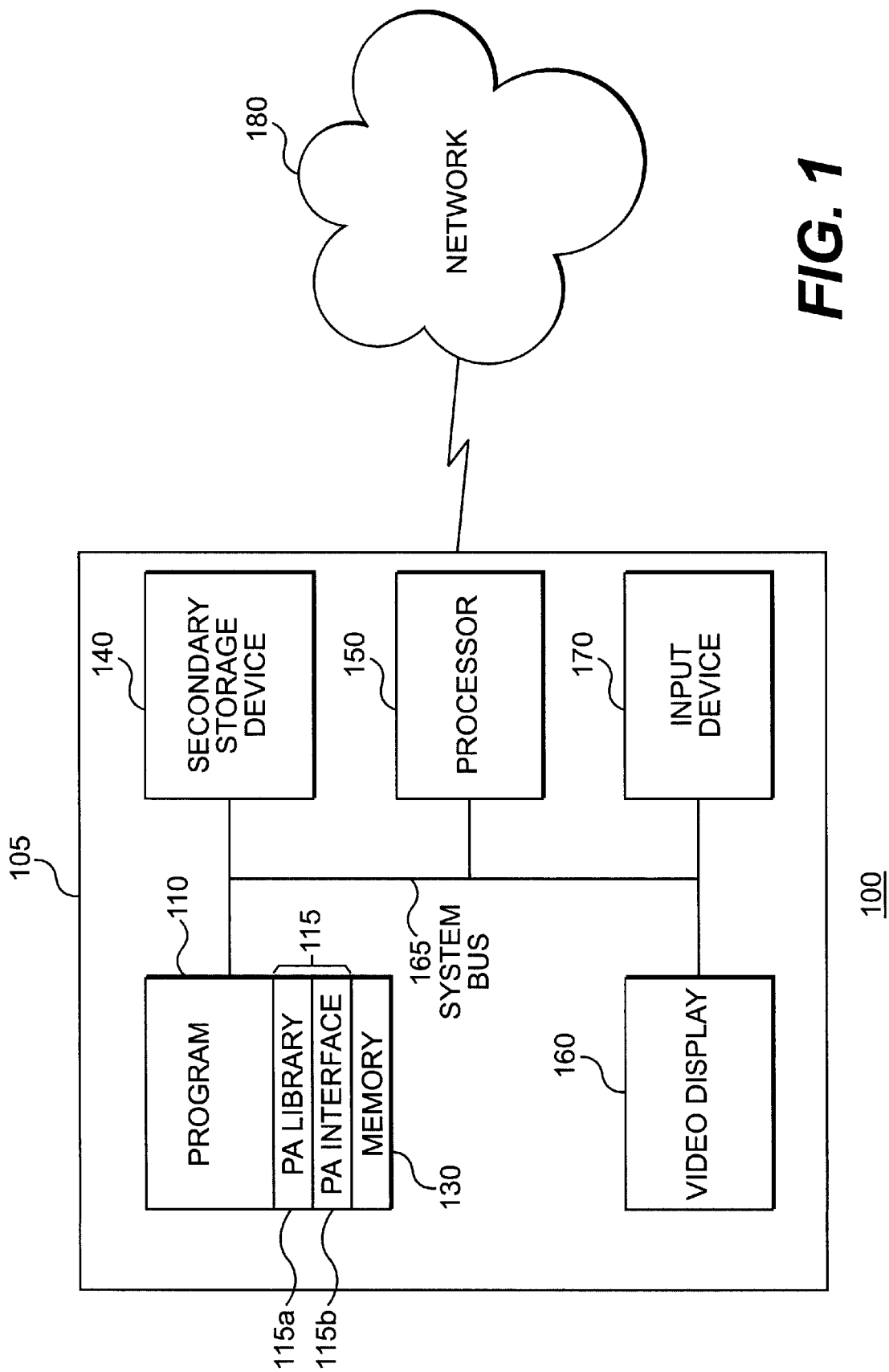
FIG. 1 depicts a data processing system suitable for implementing a performance analysis system consistent with the present invention.

FIG. 1 depicts an exemplary data processing system 100 suitable for practicing methods and systems consistent with the present invention. Data processing system 100 includes a computer system 105 connected to a network 190, such as a Local Area Network, Wide Area Network, or the Internet.

Computer system 105 contains a main memory 130, a secondary storage device 140, a processor 150, an input device 170, and a video display 160. These internal components exchange information with one another via a system bus 165. The components are standard in most computer systems suitable for use with practicing methods and configuring systems consistent with the present invention. One such computer system is the SPARC station from Sun Microsystems, Inc.

Although computer system 100 contains a single processor, it will be apparent to those skilled in the art that methods consistent with the present invention operate equally as well with a multi-processor environment.

Memory 130 includes a program 110 and a performance analyzer 115. Program 110 is a multi-threaded program. For purposes of facilitating performance analysis of program 110 in a manner consistent with the principles of the present invention, the program is instrumented with appropriate instructions of the developer's choosing to generate certain performance data.

Performance analyzer 115 is comprised of two components. The first component 115a is a library of functions to be performed in a manner specified by the instrumented program. The second component 115b is a developer interface that is used for two functions: (1) automatically instrumenting a program; and (2) viewing performance information collected when an instrumented program is executed.

As explained, instrumentation can be done automatically with the use of performance analyzer interface 115b. According to this approach, the developer simply specifies for the analyzer the type of performance data to be collected and the analyzer adds the appropriate commands from the performance analysis database access language to the program in the appropriate places. Techniques for automatic instrumentation in this manner are familiar to those skilled in the art. Alternatively, the developer may manually insert commands from the performance analysis database access language in the appropriate places in the program so that during execution specific performance data is recorded. The performance data generated during execution of program 110 is recorded in memory, for example, main memory 130.

Performance analyzer interface 115b permits developers to view performance information corresponding to the performance data recorded when program 110 is executed. As explained below, the developer may interact with the analyzer to alter the view to display performance information in various configurations to observe different aspects of the program's performance without having to repeatedly execute the program to collect information for each view, provided the program was properly instrumented at the outset. Each view may show (i) a complete measurement cycle for one or more threads; (ii) when each thread enters and leaves each state; and (iii) selected performance criteria corresponding to each state.

Although not shown in FIG. 1, like all computer systems, system 105 has an operating system that controls its operations, including the execution of program 110 by processor 150. Also, although aspects of one implementation consistent with the principles of the present invention are described herein with performance analyzer stored in main memory 120, one skilled in the art will appreciate that all or part of systems and methods consistent with the present invention may be stored on or read from other computer-readable media, such as secondary storage devices, like hard disks, floppy disks, and CD-ROM; a carrier wave received from the Internet; or other forms of ROM or RAM. Finally, although specific components of data processing system 100 have been described, one skilled in the art will appreciate that a data processing system suitable for use with the exemplary embodiment may contain additional or different components.

Figure 2:
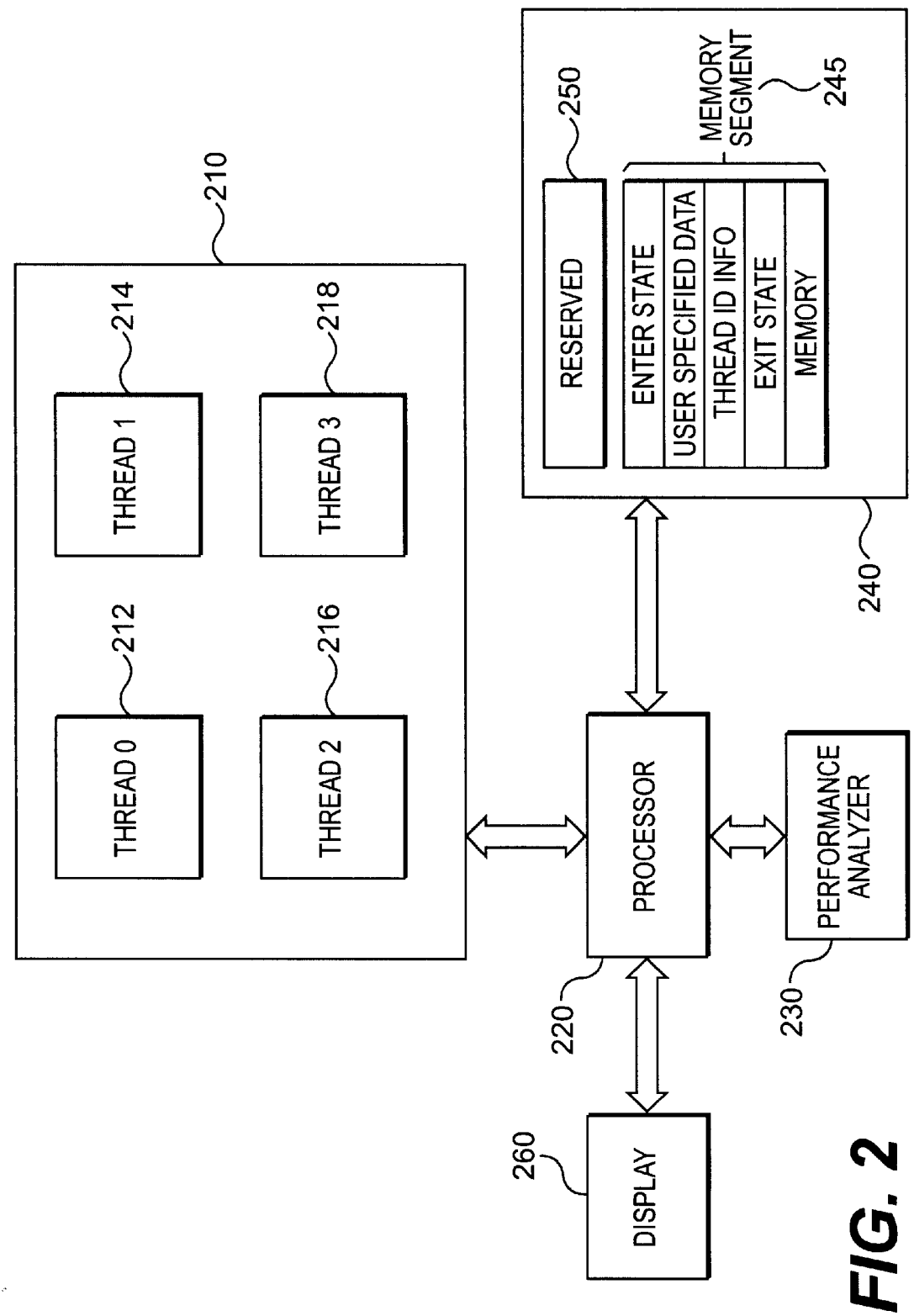
FIG. 2 depicts a block diagram of a performance analysis system operating in accordance with methods, systems, and articles of manufacture consistent with the present invention.

FIG. 2 depicts a block diagram of a performance analysis system consistent with the present invention. As shown, program 210 consists of multiple threads 212, 214, 216, and 218. Processor 220 executes threads 212, 214, 216, and 218 in parallel. Memory 240 represents a shared memory that may be accessed by all executing threads. A protocol for coordinating access to a shared memory is described in U.S. patent application Ser. No. 09/244,135, of Shaun Dennie, entitled "Protocol for Coordinating the Distribution of Shared Memory", which is incorporated herein by reference. Although a single processor 220 is shown, multiple processors may be used to execute threads 212, 214, 216, and 218.

To facilitate parallel execution of multiple threads 212, 214, 216, and 218, an operating system partitions memory 240 into segments designated for operations associated with each thread and initializes the field of each segment. For example, memory segment 245 is comprised of enter and exit state identifiers, developer specified information, and thread identification information. An enter state identifier stores data corresponding to when, during execution, a thread enters a particular state. Similarly, an exit state identifier stores data corresponding to when, during execution of an application program, a thread leaves a particular state. Developer specified data represents the performance analysis data collected.

A reserved area of memory 250 is used to perform administrative memory management functions, such as, coordinating the distribution of shared memory to competing threads. The reserved area of memory 250 is also used for assigning identification information to threads using memory.

Figure 3:
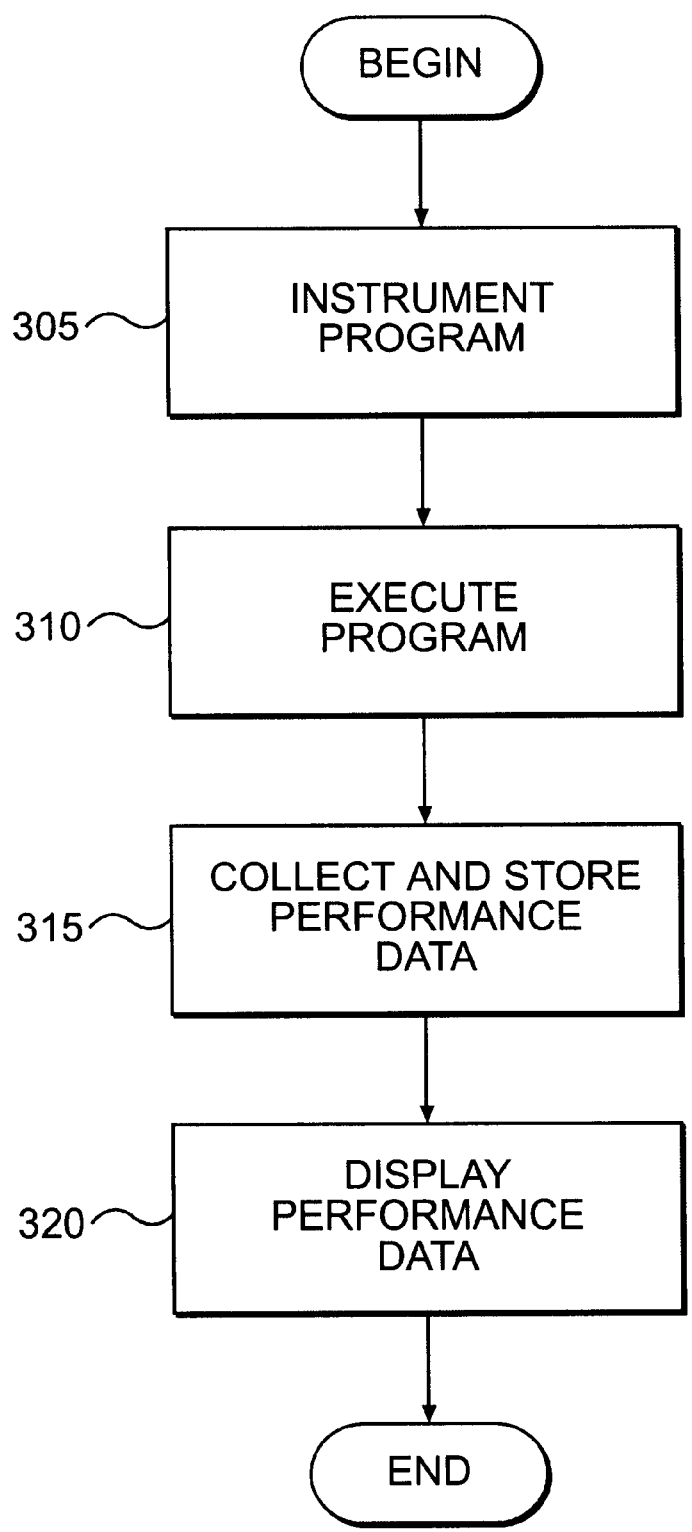
FIG. 3 depicts a flow chart illustrating operations performed by a performance analysis system consistent with an implementation of the present invention.

The flow chart of FIG. 3 provides additional details regarding the operation of a performance analysis system consistent with an implementation of the present invention. Instructions that generate performance data are inserted into a program (step 305). The instrumented program is executed and the performance data are generated (steps 310 and 315). In response to a request to view performance data, performance analyzer accesses and displays the performance data (step 320).

Performance analyzer is capable of displaying both the performance data and the related source code and assembly code, i.e., machine instructions, corresponding to the data. This allows a developer to relate performance data to both the source code and the assembly code that produced the data.

Figure 4:
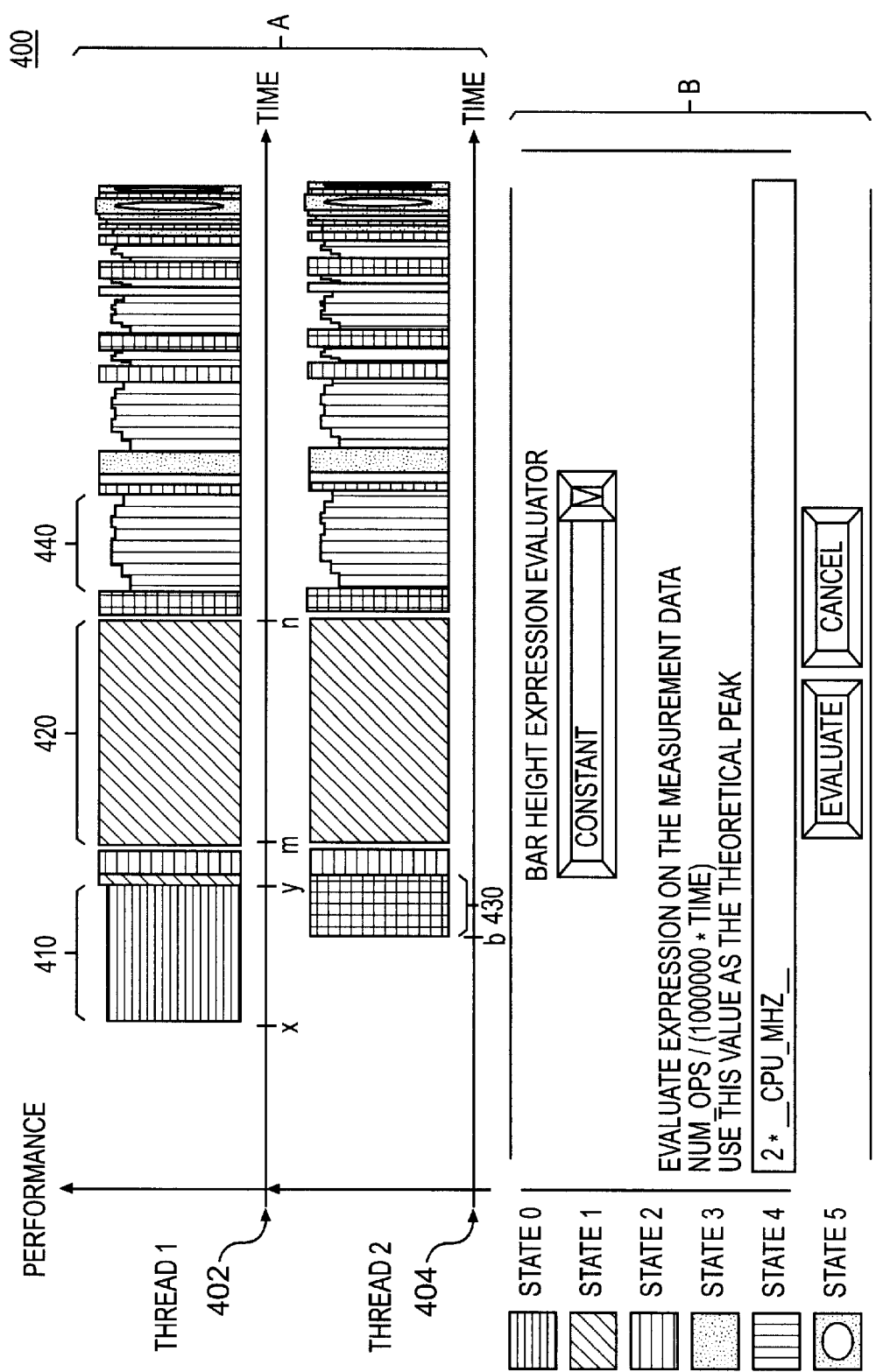
FIG. 4 depicts a multi-dimensional display of the performance data associated with an application program that has been instrumented in accordance with an implementation of the present invention.

FIG. 4 shows a display 400 with two parts labeled A and B, respectively. The first part, labeled A, shows the performance characteristics of an application program in four dimensions: threads, time, states, and performance. Performance information for each thread is displayed horizontally using a bar graph-type format. Time is represented on the horizontal axis; performance is represented on the vertical axis.

Two threads, thread 1 and thread 2 in display 400, were executing concurrently. As shown, the threads began executing at different times. The horizontal axis for thread 1 is labeled 402. Thread 1 began executing at a point in time labeled "x" on the horizontal axis 402. The horizontal axis for thread 2 is labeled 404. Thread 2 began executing at time "b". Each thread performed operations in multiple states, each state being represented by a different pattern. Thread 2 was idle at the beginning of the measuring period. One reason for this idle period may be that thread 2 was waiting for resources from thread 1. Based on this information, a developer can allocate operations of a thread among states such that performance will be improved, for example, by not executing concurrent operations that require use of the same system resources.

As shown, thread 1 entered state 410 at a point in time "x" on the horizontal axis 402 and left state 410 at time "y", and entered state 420 at time "m" and left state 420 at time "n". The horizontal distance between points "x" and "y" is shorter than the horizontal distance between points "m" and "n". Therefore, thread 1 operated in state 420 longer than it operated in state 410. The vertical height of the bars show a level of performance. The vertical height for state 410 is lower than the vertical height for state 420, showing that states 410 and 420 operated at different levels of performance. The change in vertical height as an executing thread transitions from one state to another corresponds to changes in performance level. This information may be used to identify the affect of transitioning between consecutive states on performance, and directs a developer to areas of the program for making changes to increase performance.

The bottom-half of the display, labeled B, illustrates an expression evaluation feature of the performance analyzer's interface. A developer specifies computational expressions related to a performance metric of a selected state(s). The performance analyzer computes the value of an expression for the performance data collected.

In the example shown, the developer has selected state 440. The expression on the first line, "NUM_OPS/ (100000*TIME)", is an expression for computing the number (in millions) of floating point instructions per second (MFLOPS). The expression on the second line, "2*_CPU_MHZ" calculates a theoretical peak level of performance for a specified state. Performance analyzer may evaluate these two expressions in conjunction to provide quantitative information about a particular state. For example, by dividing MFLOPS by the theoretical peak performance level for state 440, performance analyzer calculates for the developer the percentage of theoretical peak represented by each operation in state 440.

Conclusion

Methods and systems consistent with the present invention collect performance data from hardware and software components of an application program, allowing a developer to understand how performance data relates to each thread of a program and complementing a developer's ability to understand and subsequently diagnose performance issues occurring in a program.

Although the foregoing description has been described with reference to a specific implementation, those skilled in the art will know of various changes in form and detail which may be made without departing from the spirit and scope of the present invention as defined in the appended claims and the full scope of their equivalents.

What is claimed is:

1. A method for analyzing performance of an application program executing in a data processing system, wherein the application program is executed using multiple threads and each thread passes through multiple states, the method comprising:

reading data corresponding to a predetermined performance-related aspect of the application program for more than one state of each thread during a measuring period; and displaying an image comprising a graph for each thread reflecting the measuring period, a performance level corresponding to the predetermined performance-related aspect of the application program, and changes in performance at points in time in each state.

2. An apparatus for analyzing performance of an application program, the apparatus comprising:

a memory including a program that:

reads data corresponding to a predetermined performance-related aspect of the application program for more than one state of each thread during a measuring period, and displays an image comprising a graph for each thread reflecting the measuring period, a performance level corresponding to the predetermined performance-related aspect of the application program, and changes in performance at points in time in each state; and a processor that runs the program.

3. A computer-readable medium containing instructions for controlling a computer system to perform a method of operating a processor, the method comprising:

reading data corresponding to a predetermined performance-related aspect of the application program for more than one state of each thread during a measuring period; and displaying an image comprising a graph for each thread reflecting the measuring period, a performance level corresponding to the predetermined performance-related aspect of the application program, and changes in performance at points in time in each state.

4. A method for analyzing performance of an application program executing in a data processing system, wherein the application program is executed using multiple threads, each thread passing through multiple states, the method comprising:

reading data corresponding to a predetermined performance-related aspect of the application program for more than one state of each thread during a measuring period; and displaying an image comprising a graph for each thread reflecting the measuring period and a performance level corresponding to the predetermined performance-related aspect of the application program, and indicating to a user any portions of the application program to be adjusted to improve performance of the application program.

5. The method of claim 4, wherein the graph indicates to a user any portions of the application program to be adjusted to improve synchronizing operations among the threads.

* * * * *